United States Patent [19]

Walker et al.

[11] Patent Number: 4,589,249

[45] Date of Patent: May 20, 1986

[54] MOWING APPARATUS

[75] Inventors: Wesley M. Walker; Robert W. Walker; Dean M. Walker, all of Loveland, Colo.

[73] Assignee: Walker Manufacturing Company, Fort Collins, Colo.

[21] Appl. No.: 216,149

[22] Filed: Dec. 15, 1980

[51] Int. Cl.[4] .................. A01D 61/02; A01D 53/04
[52] U.S. Cl. ......................................... 56/16.6; 56/202
[58] Field of Search .................. 56/16.6, 11.7, 11.8, 56/202, DIG. 22

[56] References Cited

U.S. PATENT DOCUMENTS

| | | | |
|---|---|---|---|
| 3,702,051 | 11/1972 | Deines | 56/11.8 |
| 3,778,865 | 12/1973 | Schmidt et al. | 56/16.6 |
| 3,984,967 | 10/1976 | Jones | 56/11.8 |
| 4,156,337 | 5/1979 | Knudson | 56/16.6 |
| 4,158,279 | 6/1979 | Jackson | 56/16.6 |
| 4,262,475 | 4/1981 | Takahashi et al. | 56/202 |

*Primary Examiner*—Robert A. Hafer
*Attorney, Agent, or Firm*—Hugh H. Drake

[57] ABSTRACT

A vehicle is controllably powered to be steerably moved over an area. Mountable on the front is a cutter assembly. Also mounted on the vehicle is a hopper. Mowed cuttings are delivered by a conduit from the cutter to the hopper. That hopper is positioned atop the vehicle and coupled to the delivery end of the conduit. Moreover, the hopper is movable with respect to the vehicle into another position wherein the hopper is disengaged from the conduit and at which latter position cuttings may be easily removed.

14 Claims, 9 Drawing Figures

Fig_1

Fig_2

Fig_3

Fig_4

Fig_5

Fig_9

Fig_6

Fig_7

Fig_8

MOWING APPARATUS

This invention pertains to mowing apparatus. It also relates to apparatus adaptable for other purposes such as snow removal.

Self-propelled, rideable lawnmowers have long been used both for convenience and efficiency of operation. Originally, such a mower often would be arranged to have a plurality of cutter elements ganged together so as to enable the operator to cut a wide swath in a single path. More recently, so-called "riding" mowers much smaller in size have found a degree of popularity. In some cases, the overall length and width of the vehicle is not much larger than the diameter of the underlying rotary mower assembly carried by the vehicle.

Whether of the large, multiple-cutter type or of the miniaturized variety more suitable for use on a typical city lot, one frequently-encountered problem has been that such vehicles require excessive turning radius. That, of course, makes it difficult to execute a reversal in path direction at the end of the swath and it also may make it more difficult to circumvent obstacles or to follow an irregular edge margin of the area being covered.

Another difficulty especially encountered with the small-size vehicular mowers has been horizontal stability. In seeking to miniaturize overall size, the typical approach has been to mount the propulsion machinery above the cutter assembly. That, of course, raises the center of gravity. Consequently, it may be dangerous to attempt to operate such a mowing vehicle laterally across a sloping surface.

In the typical "garden variety" riding mowers, the steering control is entirely separate from the speed control. That undesirably requires the operator to divert at least one of his hands from a steering wheel to some kind of throttle in order to achieve correlation as between direction of movement and adjustment of speed. In itself, that also can prove to be dangerous.

Many people desire to collect the clippings which result from the mowing operation. Particularly in the case of the self-propelled mower, the inclusion of that additional feature poses its own problems. The often-employed collecting bag attached to an outlet tube from the cutting assembly may be awkward to handle and often gets in the way of the mowing operation.

Nevertheless, a variety of riding-type, comparatively-small self-propelled mowers appear in the marketplace. One attractive additional feature has been the availability of a snow-blowing attachment which may be substituted for the cutting assembly or, in the alternative, simply added to the front of the vehicle. While that additional utility is, of course, desirable, at least some of the same problems are posed as in the case of use of the vehicle for mowing.

It is, accordingly, a general object of the present invention to provide a new and improved vehicle which overcomes various deficiencies and shortcomings in prior apparatus such as that described above.

Another object of the present invention is to provide a new and improved vehicle which is convenient of use and operation, is flexible in adaptation for ultimate mode of utility and yet which is sufficiently simple of construction as to preserve a reasonable cost basis.

A further object of the present invention is to provide a new and improved mower apparatus that facilitates the handling of collected clippings.

In accordance with the present invention, as applied to a mower, a vehicle is controllably powered to be steerably moved over an area to be mowed. A cutter assembly is mounted on the vehicle for accomplishing the mowing operation itself. A hopper is mounted on the vehicle in a position in which the hopper is coupled to the delivery end of a conduit that delivers mowed cuttings from the cutter to the hopper. Included are means for moving the hopper with respect to the vehicle into another position in which the hopper is disengaged from the conduit. Other features included within the vehicle itself are significant, whether the vehicle is used for mowing or some other endeavor.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

A vehicle 10 is supported upon drive wheels 12 and 14 located at the front of the vehicle and a trailing wheel 16 at the rear of the vehicle and freely rotatable about a vertical axis by means of a pivot coupling 18. Bearings 20 and 22, carrying the respective axles for corresponding ones of wheels 12 and 14, are carried by an underlying main frame 24 which also is bent upwardly at 26 so as to support coupling 18.

Figure 6:
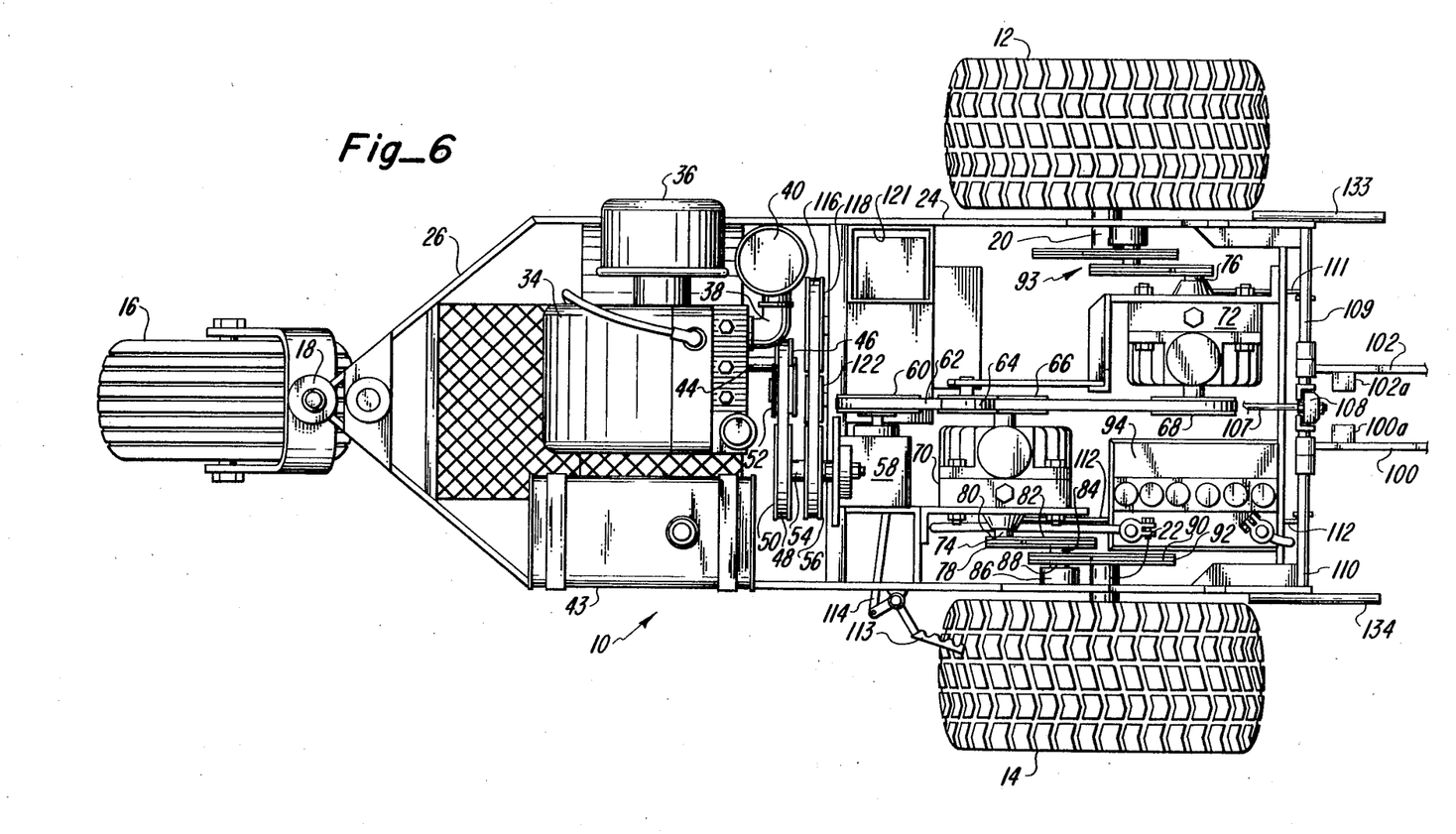
FIG. 6 is a fragmentary top plan view of a portion of that shown in FIGS. 1-3 but with covering components removed so as to expose the interior.
Figure 7:
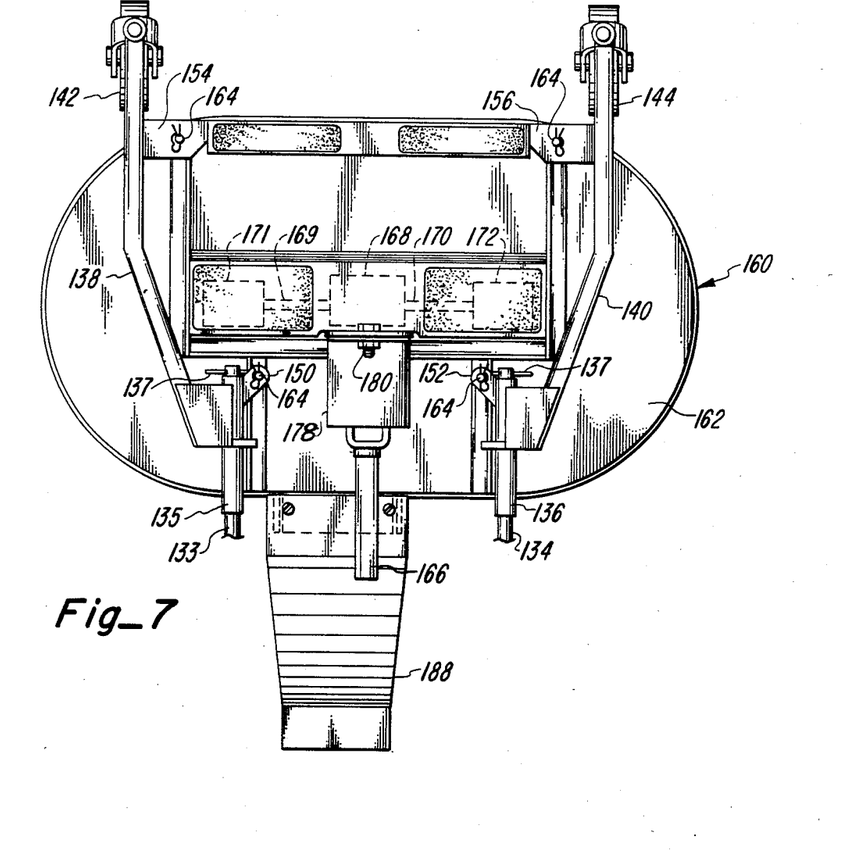
FIG. 7 is a top plan view of a fragmentary portion of the apparatus shown in FIG. 1.
Figure 8:
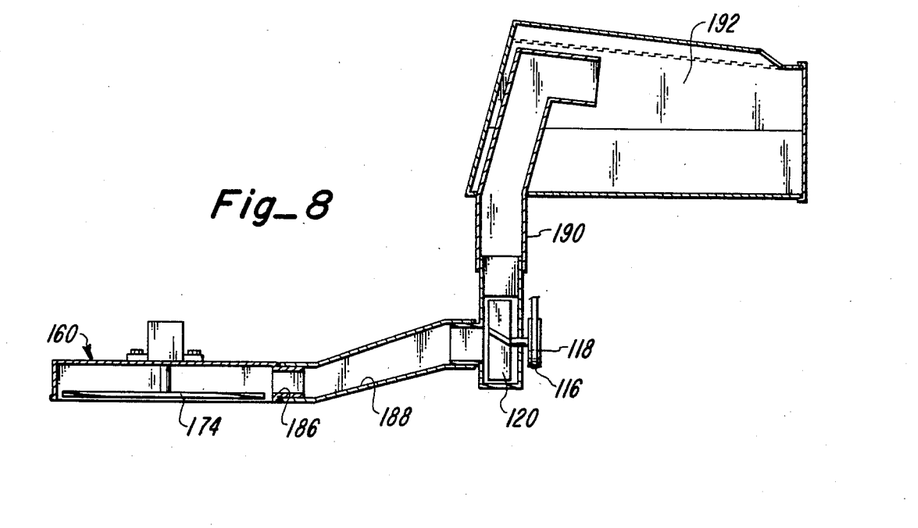
FIG. 8 is a fragmentary cross-sectional view of a portion of the apparatus as shown in FIG. 3.
Figure 9:
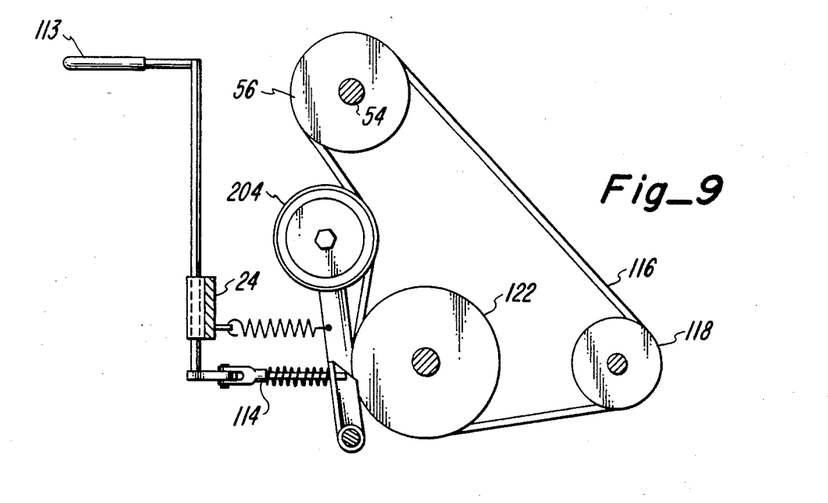
FIG. 9 is a fragmentary elevational view of a clutch and drive linkage the location of which can be seen in FIGS. 4 and 6.

Overlying frame 24 is a hood 30 that, in FIG. 6, has been entirely removed. Hood 30 is mounted at the forward end of the vehicle on a pivot at 32 so as to enable access to the enclosed machinery for inspection or service. At the rear, there is a bumper 33.

Carried by frame 24 in this case is a gasoline-fueled internal combustion engine 34 that has an air cleaner 36 and an exhaust pipe 38 which leads to a muffler 40. Engine 34 is carried from frame 24 by a mount 41. A portion of a mesh 42, that underlies the engine, preferably curves upwardly so as more fully to surround the engine compartment. Associated with engine 34 is a fuel tank 43. The motive output shaft 44 of engine 34 is attached to a pulley 46 from which runs a drive belt 48 that drives a pulley 50 and is maintained in tension by a spring-loaded idler pulley 52. Driven pulley 50 is mounted upon a shaft 54 that carries another pulley 56 and also drives a gearbox 58.

A pulley 60 on the output shaft of gearbox 58 drives a belt 62, held tight by a spring-loaded idler pulley 64, which drives both of pulleys 66 and 68 affixed to respective hydraulic motors 70 and 72. Each of motors 70 and 72 is of the variable-displacement type so that its output power, as delivered by respective shafts 74 and 76, is selectively adjustable as between no rotation of its output shaft and maximum delivered power. Shaft 74 is coupled through a chain drive 78 from a sprocket 80 to a sprocket 82 carried on a shaft 84 mounted in a bearing 86 affixed to frame 24. Another sprocket 88 on shaft 84 drives a chain 90 which in turn is in engagement with a sprocket 92 on the axle contained within bearing 22. In the same manner, the output from motor 72 by way of shaft 76 drives a corresponding chain and sprocket assembly 93 which causes rotation of wheel 12 mounted on an axle within bearing 20.

A battery 94 also is mounted with respect to frame 24 and at least supplies power for starting engine 34. In that connection, of course, engine 34 includes an alternator or generator for recharging battery 94, and vehicle 10 may, if desired, be supplied with a lighting system so as to enable use in nighttime operation.

The displacement, and thus the speed of output shaft rotation of motors 70 and 72, is controlled individually by respective operating levers 100 and 102 which project upwardly from hood 30 in a position directly in front of the operator who is seated upon a seat 104 provided atop hood 30. Each of levers 100 and 102 is spring loaded so as normally to rest in a forward position at which position its associated motor 70 or 72 is rendered operative so as to deliver power to its respective one of wheels 12 and 14. By pulling back on one or the other of levers 100 and 102, the respective hydraulic drive motor is throttled down or cut off so as at least to reduce the delivery of power to the corresponding wheel. Thus, vehicle 10 may be caused to pivot about either one of its wheels 12 and 14 as selected by the operator, and trailing wheel 16 simply follows such movement.

In this case to the right of the operator situated in seat 104 is a forward speed control lever 106. Lever 106 operates a cable 107 attached to a dog assembly 108 that rotates shafts 109 and 110. Shaft 109 has an underlying radial finger which controls movement of a rod 111 affixed to the conventional control lever on the underside of motor 72 for adjusting the rotational speed of its output shaft 76. Analogously, shaft 110 has an underlying finger which controls movement of a rod 112 that adjusts speed delivered from motor 70. The position of dog assembly 108, under control of lever 106, determines the maximum speed at which motors 70 and 72 can operate so as to drive wheels 12 and 14. On the other hand, levers 100 and 102, located directly in front of the operator, enable him to control his steering without the necessity of being concerned about speed control. That is, each of levers 100 and 102 overrides the speed control on its respective wheel otherwise imposed by the supply of power from the engine. That override occurs when ears 100a and 102a, respectively on levers 100 and 102, engage the corresponding releases disposed on the sides of dog assembly 108. By pulling back on both of levers 100 and 102, moreover, the operator can reduce speed irrespective of any other powered operation.

Located to the right of the operator situated in seat 104 is a clutch lever 113. It is connected by a linkage 114 to a clutch pulley that serves to control the delivery of motive power from pulley 56 to associated components. That is, still another pulley 204 is disposed beneath pulley 56 and is mounted to swing into and out of engagement with a belt 116. That swinging movement is under the control of lever 113 and serves to enable the tightening of a belt 116 when power is to be delivered to such other apparatus.

Pulley 56 drives belt 116 and that belt turns a pulley 118 which rotates a blower 120. Belt 116 also turns a power take-off pulley 122. Upon operation of lever 113, therefore, the clutch mechanism may be operated so as completely to disable the supply of operating power to all associated apparatus such as the blower and the mower yet to be further described. At the same time, the vehicle can be fully controlled for its own movement over an area.

Situated to the left, in this case, of the operator located on seat 104 is a throttle lever 130 and a choke lever 132 connected by suitable cables to engine 34 for the normal purposes. Once engine 34 has been started, its speed basically is allowed to remain constant at a suitable running value. All control of speed of movement of the vehicle is thereafter by means of the hydraulic control system herein described.

Projecting forwardly from the front of frame 24 are laterally space-opposed rods 133 and 134. Rods 133 and 134 are received individually within respective sleeves 135 and 136 and held in place by cotter pins 137. Individually secured to and projecting from each of sleeves 135 and 136 are respective arms 138 and 140 that project on forwardly from the vehicle and individually carry respective dolly wheels 142 and 144 on their most forward end portions.

Projecting outwardly from the end portions of each of sleeves 135 and 136 are respective ears 150 and 152 each of which includes a central opening. Somewhat similarly projecting laterally from the outer end portions of each of arms 138 and 140, just before the position of dolly wheels 142 and 144, are further ears 154 and 156 that again define openings.

Effectively mounted to arms 138 and 140 by means of ears 150-156 is a cutting assembly 160. Projecting upwardly from the shell 162 of assembly 160 are a plurality of pins 164 so positioned as to be received through the corresponding openings in the different ones of the ears and held in place therethrough simply by means of cotter keys as shown. Pins 164 preferably include a vertical series of holes for selectively receiving the cotter keys and, thus, allowing for height adjustment at all corners of assembly 160.

Coupled to cutter assembly 160 is a drive shaft 166 which is coupled at its motive-input end to receive power from pulley 122 and, in turn, is coupled through a conventional universal joint (in the housing at 178) at its output end to a transfer case 168. In this case, shaft 166 is square and slips into the end of another shaft ultimately coupled to the shaft of pulley 122. From transfer case 168, stub shafts 169 and 170 extend to respective gear boxes 171 and 172. Gear boxes 171 and 172 connect to corresponding ones of a pair of laterally displaced blades 174 that mow the grass. Housing 178 is secured to cutter assembly 160 by means of a bolt 180.

This arrangement permits easy and quick removal of the entire cutter assembly from the vehicle. Thus, any other working device, such as a snow blower or a rototiller, may easily be substituted so long as it has correspondingly-located mounting pins 164 and the provision of an equivalent to shaft 166, or a coupling to the universal joint within housing 178, for using motive power delivered from the vehicle.

The additional provision of dolly wheels 142 and 144 add significantly to the overall geometrical stability of the apparatus while yet not at all interfering with the capability of achieving sharp turns of the vehicle. As indicated, simple use of pins 164 and their cotter keys leads to ready detachability of the illustrated cutter assembly and for the substitution of a different attachment. Tension springs 182 and 184 preferably are coupled between the front end of hood 30 and sleeves 135 and 136 at about the point of juncture of the latter to arms 138 and 140. Those springs serve directly to transfer weight from assembly 160, and thus off dolly wheels 142, onto drive wheels 12 and 14. For the illustrated version which is about eighty-four inches in overall length, measurements indicate a transfer of about forty pounds from assembly or deck 160 to the drive wheels.

Projecting rearwardly from the marginal wall of shell 162 is a snout 186 that, upon installation, is received within a conduit 188. Conduit 188 is directed backwardly through frame 24 to blower 120. From blower 120, the conduit continues at 121 into a telescoping portion 190 and exhausts into a hopper 192 located atop vehicle 10.

Figure 1:
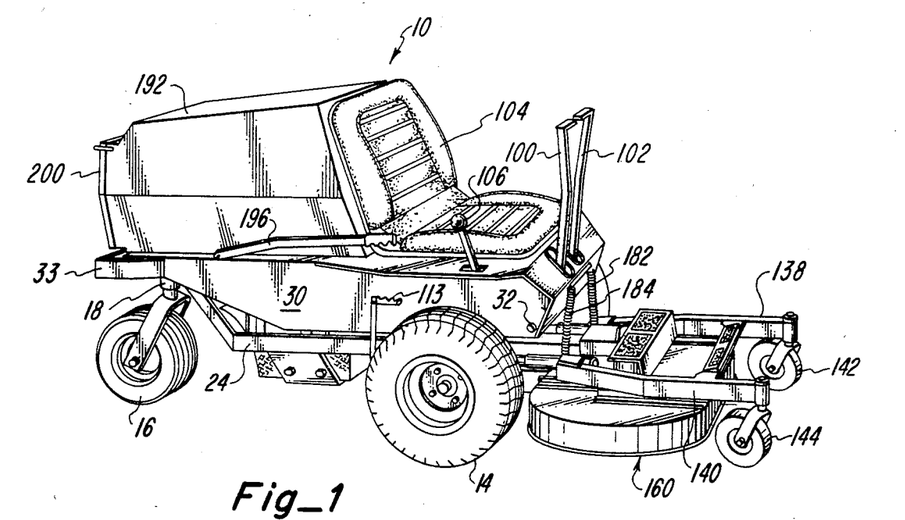
FIG. 1 is an isometric view of a mower which embodies the present invention.
Figure 2:
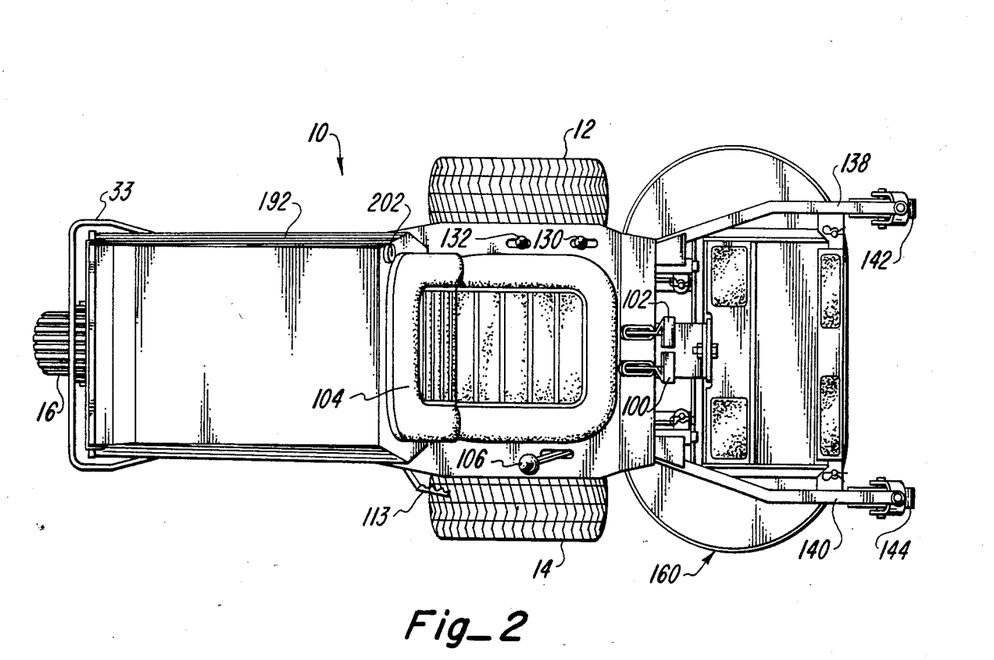
FIG. 2 is a top plan view of the mower shown in FIG. 1.
Figure 3:
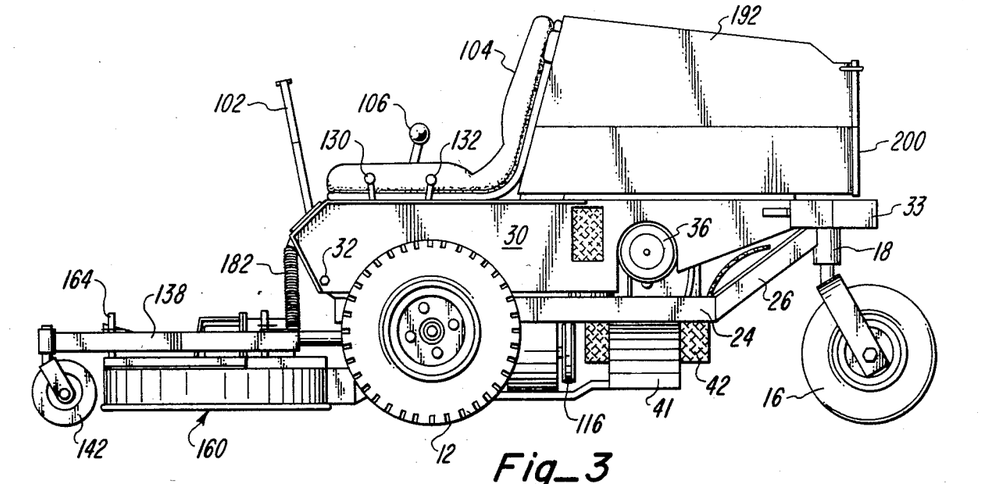
FIG. 3 is a side elevational view thereof.
Figure 4:
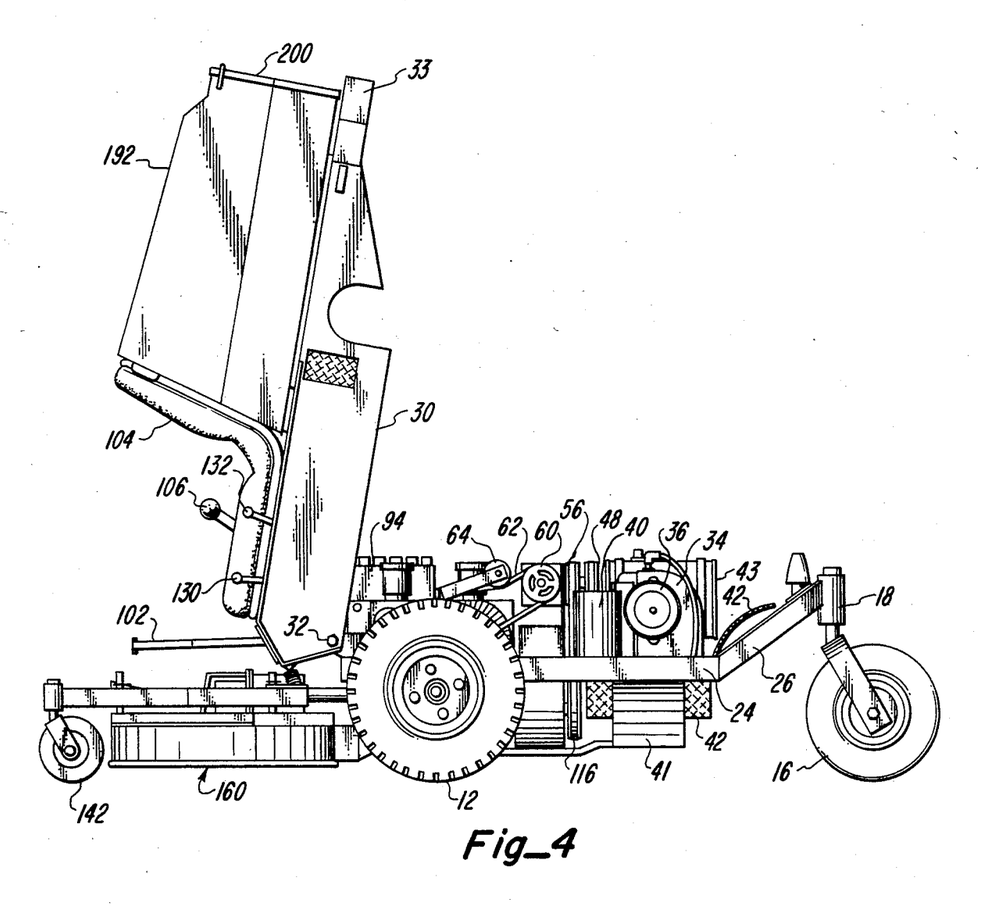
FIG. 4 is a view similar to FIG. 3 but with a component disposed in a different position.
Figure 5:
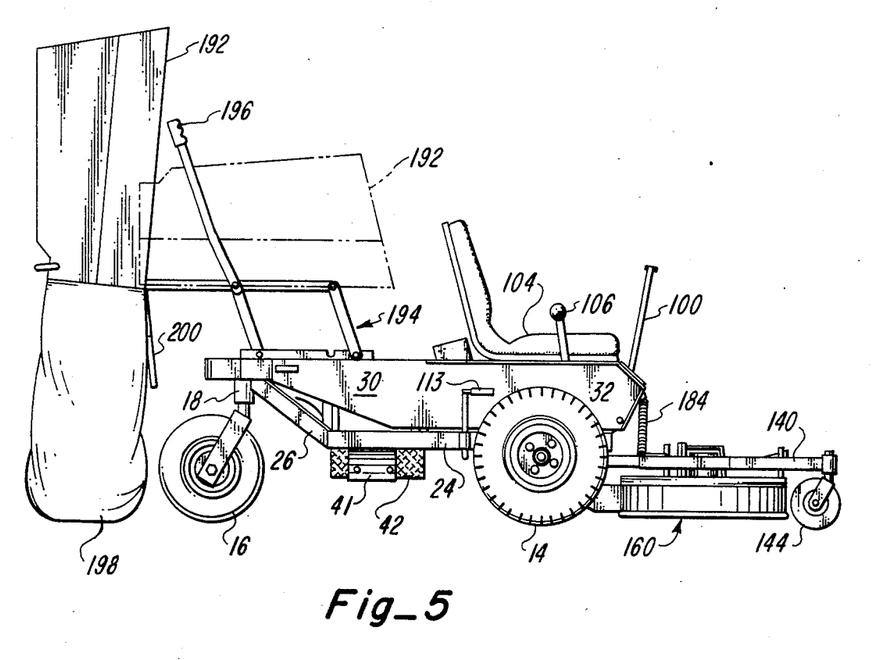
FIG. 5 is an oppositely-taken side elevational view of the mower of FIG. 1 and with a different component changed in position with a still further showing, by use of phantom outline, of yet a further position of that last-mentioned component.

Hopper 192 is located on vehicle 10 in a position generally behind seat 104. However, it is mounted to hood 30 by means of a parallelogram linkage 194 so as to be movable both vertically and horizontally between an in-use position as shown in FIG. 1 and a more upwardly and rearwardly position as shown in FIG. 5 in phantom outline. That movement, as between those positions, is under the control of lever 196 rigidly connected at one end to a pivot rod in linkage 194. Moreover, when linkage 194 is elevated as shown in FIG. 5, hopper 192 also may be tilted up and back as shown so as to discharge its contents into a receiving bag 198. During use, the rearward end of hopper 192 is closed by a hinged door 200.

It will thus be seen that vehicle 10 as embodied affords an extremely versatile apparatus. As used for the basic purpose of mowing, maneuverability is enhanced and collected clippings are readily handled and ultimately dispensed. At the same time, the arrangement is such that the mower assembly may readily be detached by the user, so that an alternative apparatus, such as a snow blower or rototiller, may be substituted.

Preferably included in hopper 192 is a fill-detector 202. Detector 202 is simply a horn or beeper, powered either from battery 94 or having its own battery, and actuated by a pressure-responsive switch coupled through a tube into the interior of conduit portion 190. An alarm sounds when the hopper is filled.

While a particular embodiment of the invention has been shown and described, and various alternatives and modifications have been taught, it will be obvious to those skilled in the art that changes and modifications may be made without departing from the invention in its broader aspects. Therefore, the aim in the appended claims is to cover all such changes and modifications as fall within the true spirit and scope of that which is patentable.

We claim:
1. A mower comprising:
 a vehicle controllably powered to be steerably moved over an area to be mowed;
 a cutter assembly mounted on said vehicle for mowing;
 a hopper mounted on said vehicle;
 means including a conduit for delivering mowed cuttings from said cutter to said hopper;
 means for mounting said hopper atop said vehicle in a position in which said hopper is coupled to the delivery end of said conduit;
 and included in said mounting means for moving said hopper with respect to said vehicle into another position in which said hopper is disengaged from said conduit.

2. A mower as defined in claim 1 in which said moving means includes means for elevating said hopper generally vertically with respect to said vehicle to disengage said hopper from said conduit.

3. A mower as defined in claim 1 in which said moving means includes means for displacing said hopper generally horizontally with respect to said vehicle upon disengagement of said hopper from said conduit.

4. A mower as defined in claim 1 in which said moving means includes means for elevating said hopper with respect to said vehicle and also for displacing said hopper generally horizontally with respect to said vehicle upon disengagement of said hopper from said conduit.

5. A mower as defined in claim 4 in which said moving means includes a parallelogram linkage coupling said hopper to said vehicle.

6. A mower as defined in claims 1 or 2 in which said hopper includes a rear door normally-vertical and openable to permit delivery of said cuttings accumulated within said hopper.

7. A mower comprising:
 a vehicle controllably powered to be steerably moved over an area to be mowed;
 a cutter assembly mounted on said vehicle for mowing;
 a hopper mounted on said vehicle;
 means including a conduit for delivering mowed cuttings from said cutter to said hopper;
 means for mounting said hopper on said vehicle in a position in which said hopper is coupled to the delivery end of said conduit;
 a motive power system carried by said vehicle;
 a said delivering means including blower for impelling cuttings from said cutter to said hopper through said conduit;
 and a clutch for selectively enabling operation of said cutter assembly and said blower separately from common powering of movement of said vehicle.

8. A mower comprising:
 a vehicle controllably powered to be steerably moved over an area to be mowed;
 a cutter assembly mounted on said vehicle for mowing;
 a hopper mounted on said vehicle;
 means including a conduit for delivering mowed cuttings from said cutter to said hopper;
 means for mounting said hopper on said vehicle in a position in which said hopper is coupled to the delivery end of said conduit;
 a motive-power system carried by said vehicle;
 means responsive to said motive power system for propelling said vehicle;

means responsive to said motive power system for driving said delivering means and said cutter assembly;

and a common element for supplying power from said motive-power system selectively to both of said responsive means.

9. A mower as defined in claim 8 in which a blower is included for impelling cuttings through said conduit, and in which said common element includes a single drive link for supplying power from said motive-power system to said blower and said cutter assembly.

10. A mower as defined in claims 1 or 8 in which said hopper is entirely enclosed and in which said hopper includes pressure-responsive audible alarm means for indicating when said hopper is filled with said clippings.

11. A mower as defined in claims 1 or 8 which also includes lever means responsive to manual control for both enabling propulsion and steering of said vehicle and also operation of said delivering means and cutter assembly.

12. A steerable vehicular appliance comprising:

a frame;

a pair of drive wheels mounted from one end of said frame;

an engine carried by said frame;

a throttle for operating said engine at a constant speed;

a pair of motors selectively operable to supply power for rotation of said drive wheels in response to power supplied by said engine;

a pair of levers manually operable to control said supply of power from said motors to said drive wheels;

a motive transfer unit coupled between said engine and said motors;

means, including another manually-operable lever, for regulating and limiting the supply of power from said engine to said motors through action of said pair of levers;

a power take-off mounted from said frame and coupled to receive power from said engine;

means for removably mounting an appliance apparatus to said frame;

means carried by said frame for coupling power from said take-off to said appliance apparatus;

and additional wheel means mounted from the other end of said frame.

13. An appliance as defined in claim 12 in which said mounting means includes means for loosely attaching said appliance to said frame and which further includes means, secured between the rear of said appliance and said frame for maintaining said attaching means under a resilient force which transfers weight of said appliance apparatus to said drive wheels.

14. An appliance as defined in claim 12 which further includes a single motive transfer element coupling said motive transfer unit to both of said motors.

* * * * *

UNITED STATES PATENT OFFICE
CERTIFICATE OF CORRECTION

Patent No. 4,589,249     Dated   May 20, 1986

Inventor(s) Wesley M. Walker; Robert W. Walker; Dean M. Walker

It is certified that error appears in the above-identified patent and that said Letters Patent are hereby corrected as shown below:

Column 6, line 11:  after "and", insert --means --.

Signed and Sealed this

Twenty-eighth Day of February, 1989

Attest:

DONALD J. QUIGG

Attesting Officer    Commissioner of Patents and Trademarks